(12) United States Patent
Harrigan

(10) Patent No.: US 6,317,268 B1
(45) Date of Patent: Nov. 13, 2001

(54) MOVIE PROJECTION LENS

(75) Inventor: Michael Harrigan, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/448,214

(22) Filed: Nov. 23, 1999

(51) Int. Cl.$^7$ .............................. G02B 9/00; G02B 27/42
(52) U.S. Cl. ............................................. 359/649; 359/558
(58) Field of Search .................................. 359/648, 649, 359/650, 651, 558

(56) References Cited

U.S. PATENT DOCUMENTS

| | | |
|---|---|---|
| 4,929,071 * | 5/1990 | Mercado . |
| 5,268,790 * | 12/1993 | Chen ..................................... 359/558 |
| 5,790,321 | 8/1998 | Goto . |
| 5,880,879 | 3/1999 | Foo . |
| 5,883,744 | 3/1999 | Maruyama . |
| 5,923,479 | 7/1999 | Nagata . |
| 6,014,267 * | 1/2000 | Tsurutani et al. ..................... 359/689 |

OTHER PUBLICATIONS

Press release Fernseh–Und Kinotechnik 10/88; G.M. Morris; Diffraction Theory for an Achromatic Fourier Transform; Appl. Opt. 20, 2017 (1981). T. Stone & N. George; Hybrid Singlet Arbitrarily Dispersive Element; J. Opt. Soc. Am. A4(13), 77(1987). T. Stone & N. George; Hybrid Diffractive–refractive Lenses and Achromats; 27(14), 2969(1988). L.B. Lesem & P.M. Hirsch; The Kinoform: Anew Wavefront Reconstruction Device; IBM Journal of Research and Development, vol. 13, pp. 150–155(1969).

* cited by examiner

*Primary Examiner*—Scott J. Sugarman
(74) *Attorney, Agent, or Firm*—Nelson Adrian Blish

(57) ABSTRACT

A movie projection lens (40) for forming an image over the visible spectrum, at high magnification is disclosed. The movie projection lens (40) comprises in order, from a movie screen (62) side of the movie projection lens (40) a diffractive lens (42) with negative power, followed by a group (45) of positive (43) and negative (44) refractive lens elements with overall negative power. A diffractive lens (33) with positive power is followed by a group (46) of positive (43) and negative (44) refractive lens elements with overall positive power. The positive refractive group (46) is located adjacent to film (64) The positive power diffractive lens (33) has minimal affect on lateral chromatic aberration. The negative power diffractive lens (42) affects both lateral and axial chromatic aberration and has a greater affect on lateral aberration than on axial aberration.

8 Claims, 8 Drawing Sheets

MOVIE PROJECTION LENS

FIELD OF THE INVENTION

This invention relates to projection lens in general and in particular to a movie projection lens for 35 millimeter movie film.

BACKGROUND OF THE INVENTION

In order to improve the image quality of movies, it is important to design projection lenses with higher MTF (Modulation Transfer Function) values. Some enhanced optical designs have been implemented in the last twenty years which improved the quality of movies. FIG. 1 shows a cross section of an Ultra Star HD lens with a focal length of 85 mm, which represents the current state of the art. See "Press release Fernseh-Und Kinotechnik 10/88." An improvement in the MTF of this design is shown in FIG. 2a comparing it to the MTF of a competing product, the Cinelux-Ultra MC lens. The MTF of the Ultra Star HD lens across the image field for three spatial frequencies, 30 lines/mm, 50 lines/mm, and 70 lines/mm is illustrated in FIG. 2b. While these newer designs have had a significant impact on the image quality of movies, progress can still be made to further push the state of the art of movie projection lens optics.

The primary limiting factor in projector lens optics is secondary color aberration, both axial and lateral. Primary axial color aberration is corrected when light at the ends of the visible spectrum, red and blue, are brought to the same focus. Secondary axial color aberration is the focus separation between the light in the center of the visible spectrum and the light at the ends of the visible spectrum. Spherochromatism, the variation of spherical aberration with wavelength limits the performance of state of the art lenses, as does secondary lateral color aberration, which is the variation of image size between images in the center of the visible spectrum and the ends of the visible spectrum. Secondary chromatic aberration is notoriously difficult and expensive to correct because exotic glasses are required if a conventional all-refractive optical system is used. Glass with the required optical properties is expensive, and is typically difficult to manufacture.

It has been known in the art that diffractive lenses can reduce chromatic aberrations. The earliest references on this subject were applied to holographic lenses, a particular type of diffractive lens. See G. M. Morris, "Diffraction Theory for an Achromatic Fourier Transform," Appl. Opt. 20, 2017 (1981); T. Stone and N. George, "Hybrid Singlet Arbitrarily Dispersive Element," J. Opt. Soc. Am. A4(13), 77(1987); T. Stone and N. George, "Hybrid Diffractive-refractive Lenses and Achromats," 27(14), 2969(1988). Diffractive lenses, with an effective V number of −3.45 in the visible, have large dispersions and are opposite to that of refractive glass lenses, enabling compensation of refractive lens dispersions by using weak diffractive lens powers.

Many patents have issued taking advantage of this fact, including U.S. Pat. Nos. 5,923,479, 5,883,744, 5,880,879, and 5,790,321. For example, U.S. Pat. No. 5,923,479 teaches how to use one diffraction lens to reduce both axial and lateral color aberration for a retro-focus type lens. A retro-focus lens has a front negative group and a positive rear group producing a back focus greater than the lens focal length. In this patent the diffractive lens must meet certain conditions and be placed within the rear positive group. None of these references disclose the use of more than one diffractive optic to correct both axial and lateral color simultaneously, particularly both secondary axial and lateral chromatic aberrations.

The use of diffractive lenses in a movie projection lens is particularly beneficial to correct color aberration for a number of reasons. Movie projection lenses must withstand very hot environments due to the high power light sources used in movie projectors. The high power is needed because of the high magnifications required in movie theatres. It is not unusual to have magnifications of over three hundred times. The high temperatures reached by the projection optics has an impact not only on the glass choices, but the fact that no known optical cement can withstand such temperatures. This eliminates the optical design power of using cemented doublets. For example, it would normally be beneficial to use cemented doublets in the outer lens groups to correct lateral color aberration. The inability to use cemented doublets to correct chromatic aberration can be compensated through the use of diffractive optics.

One of the negative aspects of using diffractive optics is that they generally produce more flare light than refractive lenses. This is particularly true for diffractive optics made by the binary method in which approximations to smooth surfaces are made in a stair step fashion. FIG. 3a shows the continuous phase introduced into the optical wavefront by a refractive surface. Because the effects of phase repeat every 2#, or one wavelength of oscillation, it is possible to break up the phase in pieces every 2#, or one wavelength as shown in FIG. 3b. This type of surface is known as a kinoform. See L. B. Lesem and P. M. Hirsch, "The Kinoform: A New Wavefront Reconstruction Device," IBM Journal of Research and Development, Vol. 13, pp. 150–155(1969). A true binary version of the surface is shown in FIG. 3c, which has two phase levels, the surface being broken every half wavelength. A four-level binary approximation is shown in FIG. 3d in which the surface is broken every quarter wavelength. FIG. 3e is an eight-level binary version. Table 1 lists the diffraction efficiency for the various binary surfaces. The remaining light strikes the image in undesirable regions and becomes flare light. As can be seen, the more levels used in the binary diffractive optic, the more efficient it becomes with the kinoform being the most efficient.

TABLE I

| Number of phase levels | Figure | Diffraction efficiency |
| --- | --- | --- |
| 2 | 2c | 40.5% |
| 4 | 2d | 81.1% |
| 8 | 2e | 95.0% |
| 16 |  | 98.7% |

With the movie film projection, contrast ratios above 600 on theater screens are at the upper end of the capabilities of current theaters for film with a density range between $D_{max}$ and $D_{min}$ of 3.2 having an inherent capability of almost 1600 to one contrast ratio. The reduction is caused by flare light. Flare light from well-made kinoform diffractive lenses will not be easily detected under normal conditions. Also, because the scenes in movies are continually changing, the presence of small, additional flare on top of that already present will not be easily observable.

It is desirable to use diffractive lenses in a movie projector lens while limiting secondary axial and secondary lateral color aberration.

SUMMARY OF THE INVENTION

It is the object of the present invention to provide a movie projection lens which limits secondary axial and secondary lateral color aberration.

Another object of this invention is to provide a movie projection lens having an improved working distance from the film to the lens.

It is a further object of the present invention to provide superior correction of both axial and lateral color, primary and secondary through the use of two diffractive lenses.

According to one aspect of the present invention a movie projection lens for forming an image over the visible spectrum, at high magnification, comprises a diffractive lens with negative power on the movie screen side of the movie projection lens, followed by a group of positive and negative refractive lens elements with overall negative power. This is followed by a diffractive lens with positive power, followed by a group of positive and negative refractive lens elements with overall positive power. The positive power diffractive lens has minimal affect on lateral chromatic aberration. The negative power diffractive lens affects both lateral and axial chromatic aberration and has a greater affect on lateral aberration than on axial aberration.

An advantage of the present invention is that it corrects primary axial and lateral color aberration and secondary axial and lateral color aberration without to using exotic glasses with abnormal dispersions.

Another advantage of the present invention is that it allows the lenses to be farther away from the heat of the illumination optical system thereby reducing the chance of heat damage to the projection lens.

A further advantage of the present invention is that one diffractive lens is placed near an aperture stop so that the chief ray heights are small in comparison to the axial marginal ray heights. This enables the diffractive lens to affect axial color aberration to a much larger extent than lateral color aberration. If the chief ray heights were exactly zero, then this diffractive lens would not contribute to lateral color aberration. The second diffractive lens is placed in front of the lens where the chief ray heights are larger than the paraxial marginal ray heights, so it affects lateral color aberration more strongly than axial color aberration. This separation of the two diffractives one affecting mostly axial and one mostly lateral color, permits a superior overall correction of all chromatic aberrations as will be shown.

An additional advantage of the present invention is that diffractive optical elements can correct other aberrations, specifically, spherical aberration. By having an additional degree of freedom to adjust third order spherical aberration, it is possible for other degrees of freedom to take on values more favorable for the correction of other aberrations. A benefit of correction of the spherical aberration of the diffractive is that the contributions to spherical aberration from the refractive surfaces may be reduced. This has the additional benefit of reducing the higher order spherical aberration introduced by surfaces with large third order spherical contributions.

The invention and its objects and advantages will become more apparent in the detailed description of the preferred embodiment presented below.

DETAILED DESCRIPTION OF THE INVENTION

Figure 4:
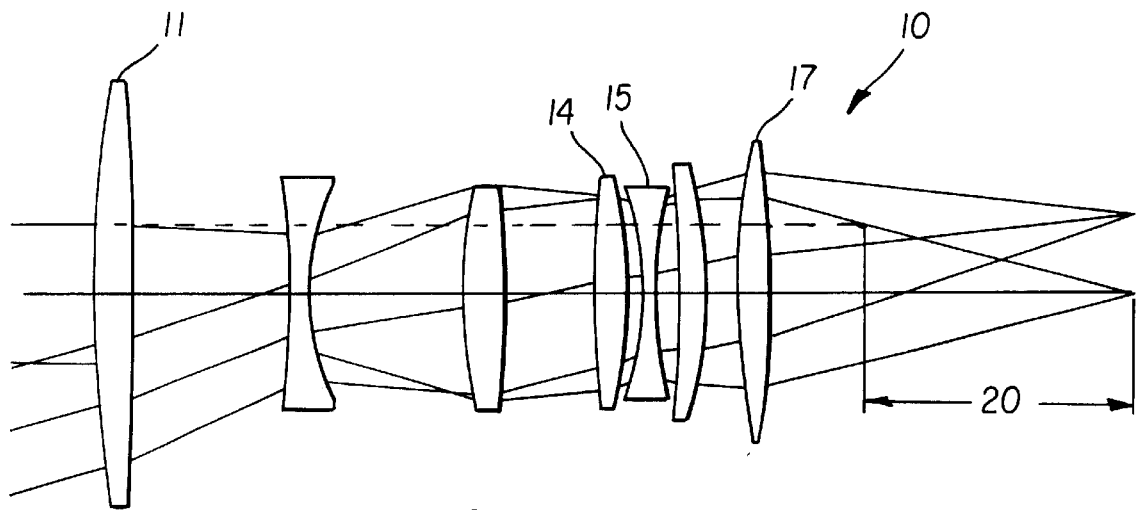
FIG. 4 is a cross sectional view of a retrofocus lens.

To clearly show the benefit of this invention it is helpful to examine a closely related lens having no diffractive optical elements. Such an example is shown in the all-refractive lens 10 of FIG. 4. This is a retrofocus design as can be seen by the fact that the entering marginal ray heights on the first lens 11 are less than the ray heights on the last lens 17. The focal length 20 is the distance from where the extension of the entering rays intersects the final marginal rays focusing on the image as shown. Improved working distance or back focus distance, the distance from the last lens element to the image, is achieved through a retro-focus design. This is also known as a reverse telephoto lens. A retro-focus object achieves a back focus longer than the focal length by having a front group, elements between object and aperture stop, which has an overall negative power while the rear groups, between image and aperture stop, have overall positive power as shown in FIG. 4.

Figure 5:
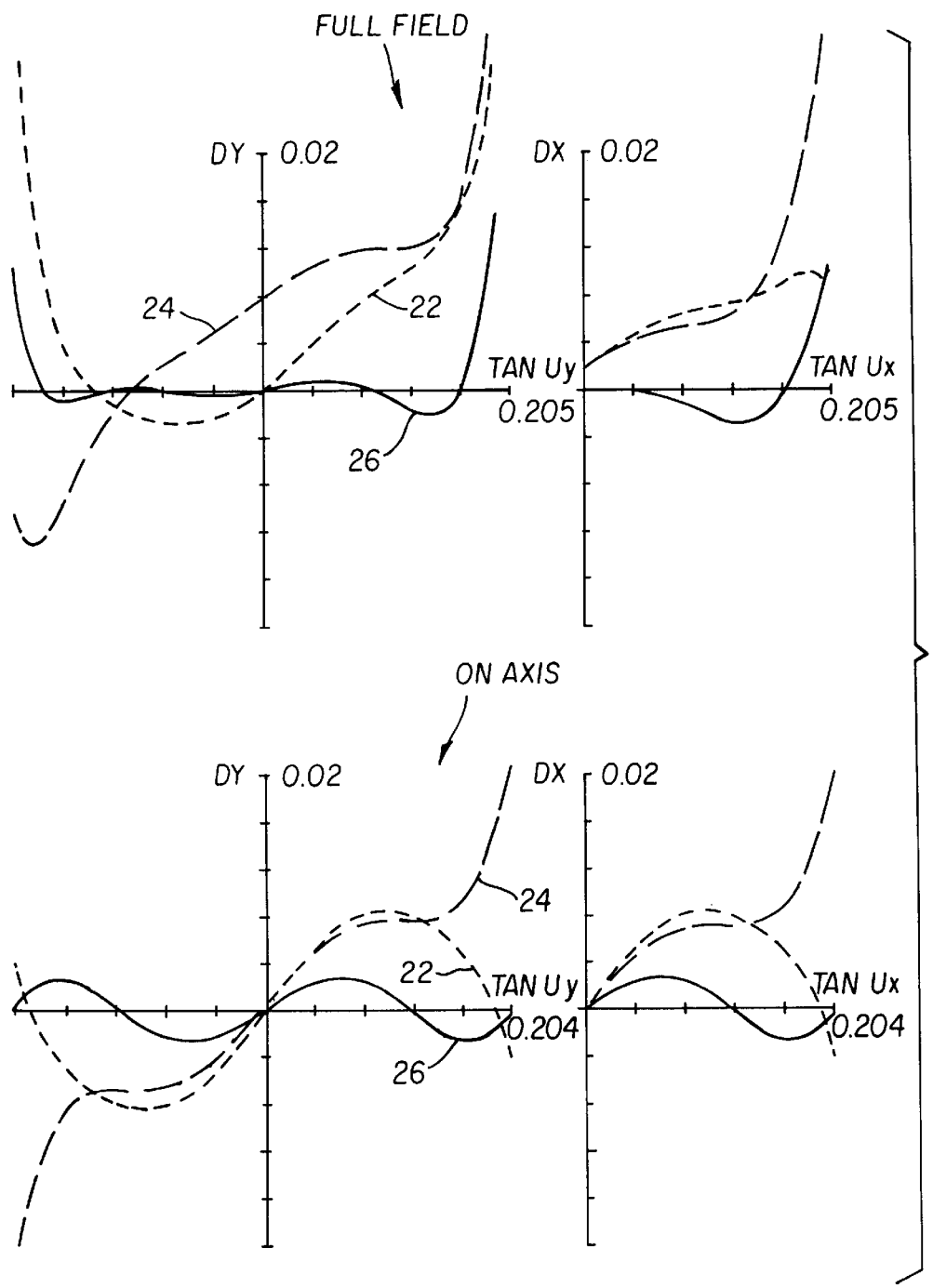
FIG. 5 shows transverse ray aberration curves for full field and axial field.

FIG. 5 shows the transverse ray aberration curves for full field at the top and for the on axis field at the bottom. The axial field shows secondary axial color and spherochromatism. The secondary axial color aberration can be seen from the slopes of the curves at the origin. The blue 22 and red 24 curves have nearly the same slope (focus), but they differ from the green light 26 slope. Spherochromatism is shown by the difference of the red and blue aberration curves at the edge of an aperture where the red curve is going positive very rapidly and the blue curve is going negative on the axis curve. The full field curves show primary lateral color aberration, the difference in Y height at the origin between the blue and red curves. Also, the curves reflect the axial secondary color aberration with similar slopes in the red and blue curves. Since these are off-axis curves, it is not really axial color, but chromatic field curvature. Higher order coma is also present because all the curves are rapidly going positive at both the top and bottom of the aperture.

Figure 6:
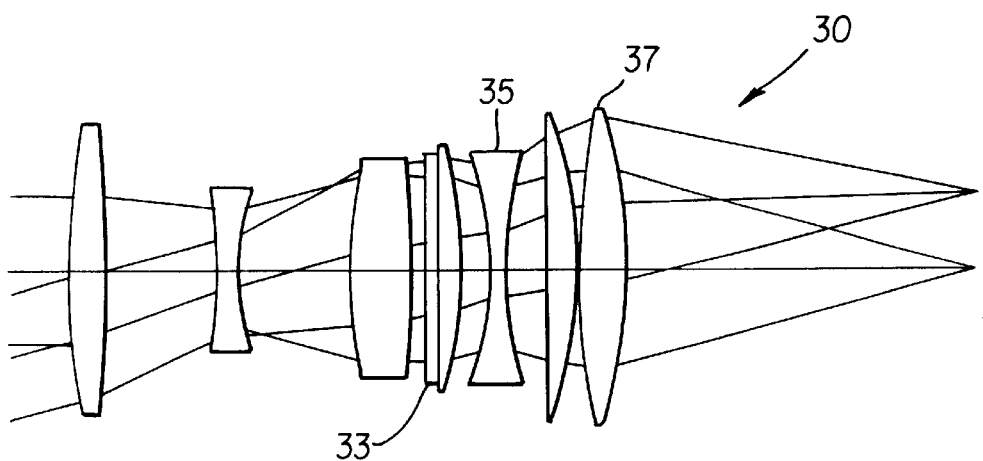
FIG. 6 is a cross sectional view of a retrofocus lens with a diffractive lens element of positive power at the center of the lens.
Figure 7:
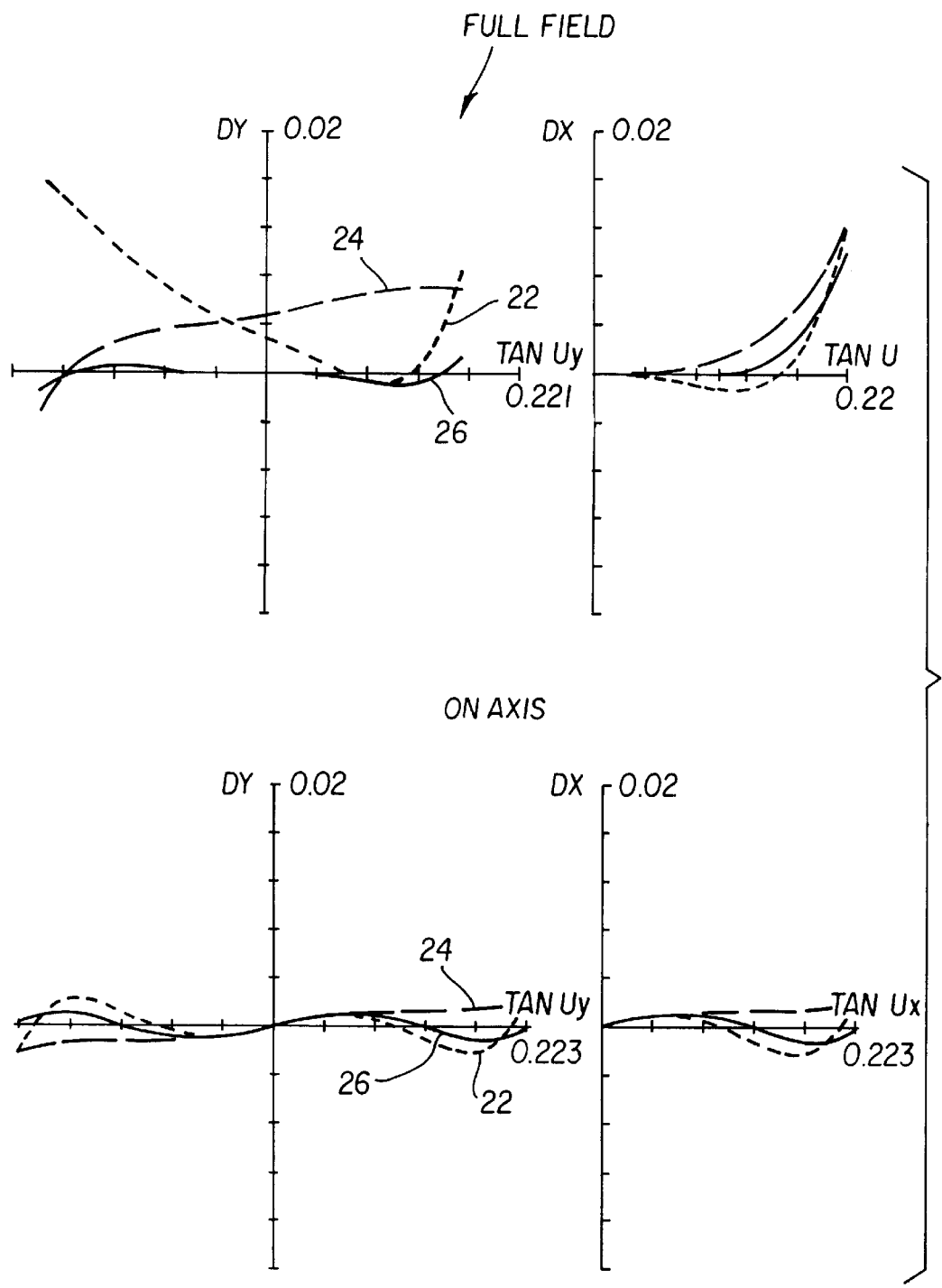
FIG. 7 shows transverse ray aberration curves for full field and axial field for the lens shown in FIG. 6.

FIG. 6 shows a similar retro-focus lens 30 with a diffractive lens 33 of positive power near the center of the lens as shown. As can be seen in FIG. 7, all three colors are in the same paraxial focal plane because at the origin of the "On Axis" aberration curves, all three colors have the same slope. This can be compared to FIG. 5, showing secondary axial color aberration. Also, the spherchromatism has been substantially reduced compared to that in FIG. 5. However, the full field curves, while improved from those in FIG. 5, still show secondary lateral color aberration and some chromatic field curvature and astigmatism. The effect of correcting the axial chromatic focal shifts is reflected in the reduction of chromatic field curvature. It can be seen that the higher order coma has been substantially reduced as well. So it can be seen that one diffractive lens can be used to advantage in the center of the lens instead of in the rear section of a retro-focus lens as disclosed in US Pat. No. 5,923,479.

To further improve the chromatic correction off-axis, a second diffractive lens is placed in front of the lens as shown in the preferred embodiment of table II. This allows the diffractive to affect the off-axis fields differently from the on-axis fields since the off-axis beam passes through a different part of the diffractive lens where the power, or fringe spacing, can be different. The contribution to lateral color aberration is proportional to the product of diffractive power, paraxial chief ray height and paraxial marginal ray heights on the diffractive lens while the contribution to axial color aberration is proportional to the diffractive power and the square of the paraxial marginal ray height on the diffractive. This offers the possibility of affecting axial and lateral color aberration somewhat separately. Ideally if the chief ray height were zero, then that diffractive lens would not contribute to lateral color aberration. While the previous design does not have the chief ray height equal to zero, it has a small value since the diffractive lens is in the central part of the lens. Having the diffractive lens in front of the lens causes the product of chief ray and marginal ray heights to be negative. To have an overall contribution the same as the axial color, is necessary for the diffractive to have negative power.

EXAMPLE 1

TABLE II $f = 51.57; F/2.3; field\ 26°$

| Surface | Radius | Thickness | Glass |
|---|---|---|---|
| Object | 0 | ∞ | |
| 1 | 0 | 3 | Fused silica |
| 2 | 0 | 1 | |
| 3 | 117.7075 | 6.410 | LF5 |
| 4 | −392.6858 | 21.507 | |
| 5 | −79.9815 | 4.003 | LaK21 |
| 6 | 32.9159 | 25.376 | |
| 7 | 60.3470 | 5.000 | LaF2 |
| 8 | −121.8439 | 6.825 | |
| 9 | 0 | 2.491 | Fused Silica |
| 10 | 0 | .100 | |
| 11 | −123.5803 | 4.599 | LaK8 |
| 12 | −65.3814 | 4.774 | |
| 13 | −46.4597 | 4.081 | SF11 |
| 14 | 67.7028 | 6.263 | |
| 15 | −1184.8 | 6.000 | LaK10 |
| 16 | −52.9274 | 2.359 | |
| 17 | 99.5120 | 8.720 | LakN13 |
| 18 | −78.8577 | 68.703 | |
| Image | −1225.0 | | |

Diffractive phase polynomial on surface 1:

$$\Phi(r) = 5.8467 \times 10^{-5} r^2 - 1.1848 \times 10^{-8} r^4 - 1.0861 \times 10^{-11} r^6$$

Diffractive phase polynomial on surface 9:

$$\Phi(r) = -2.33 \times 10^{-4} r^2 + 3.3791 \times 10^{-7} r^4 - 4.5275 \times 10^{-10} r^6$$

Figure 8:
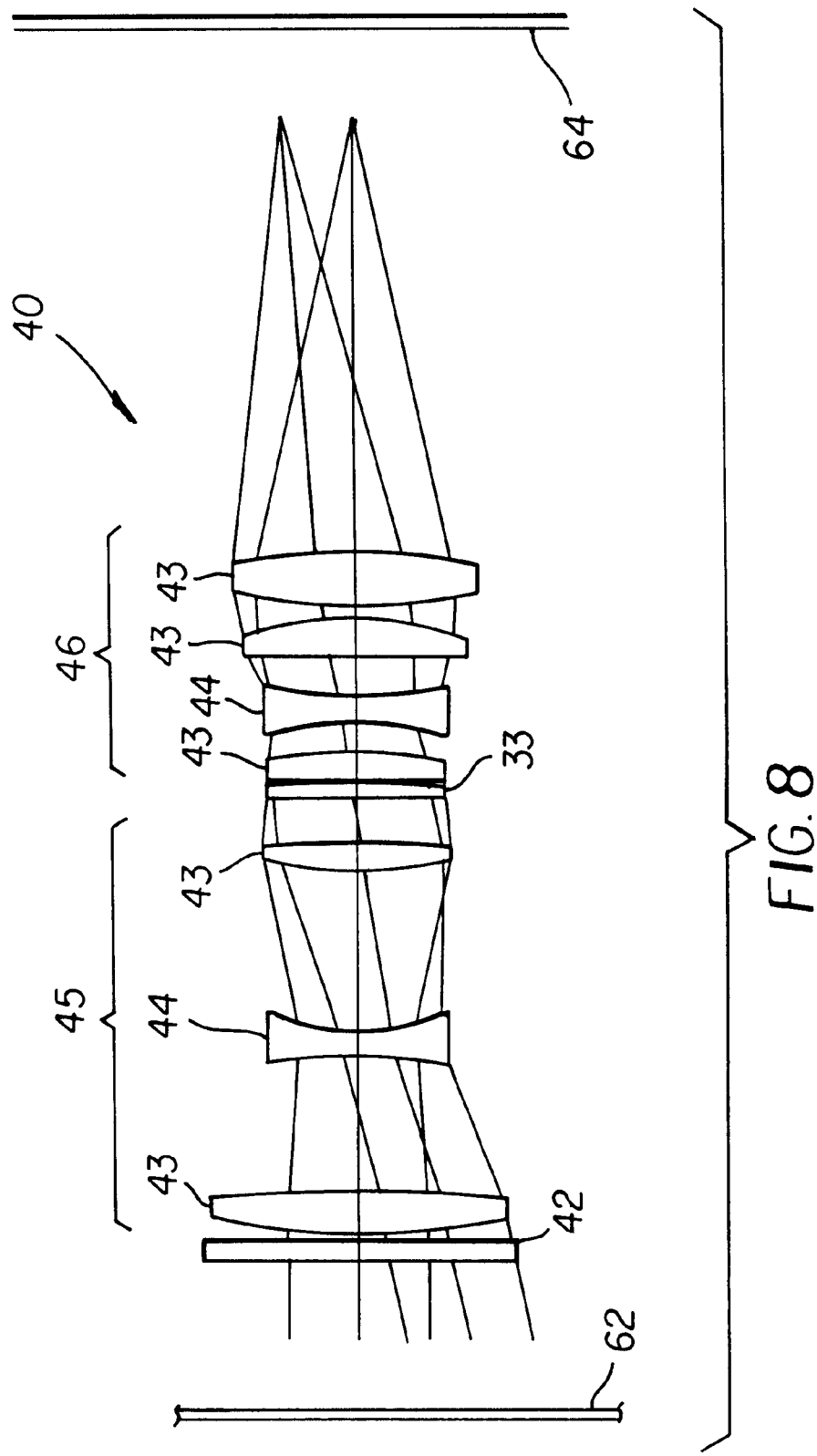
FIG. 8 is a cross sectional view of a movie projector lens according to the present invention having two diffractive lens elements.

A movie projection lens 40 having these characteristics is shown in FIG. 8. This illustrates a movie projection lens 40 with a negative diffractive lens 42 in the front of the movie projection lens 40 and a diffractive lens 33 of positive power in the center of the lens as discussed above. The movie projection lens 40, according to the present invention, has the diffractive lens 42 on the side of the lens closest to a movie screen 62. The diffractive lens 42 is followed by a group of positive 43 and negative 44 refractive lens elements, which comprise a group 45 having overall negative power. Group 45 is followed by a diffractive lens 33 with positive power. Diffractive lens 33 is followed by a group 46 of positive 43 and negative 44 refractive lens elements 43 and 44 with overall positive power.

Figure 9:
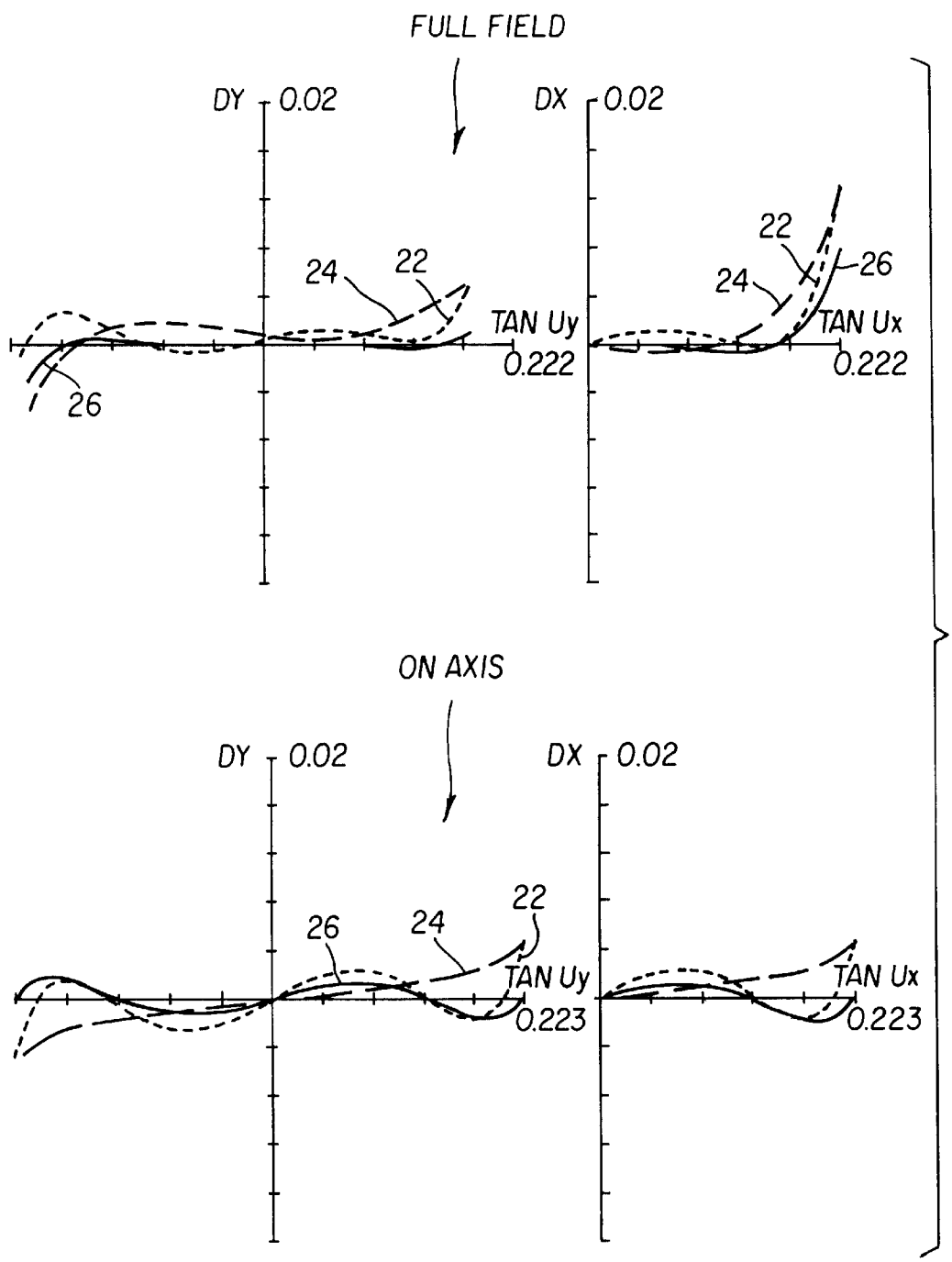
FIG. 9 shows the transverse ray aberration curves for full field and axial field for the movie projector lens shown in FIG. 8.

The benefit of the second diffractive lens in the front is shown in the full field aberration curves at the top of FIG. 9. Both the secondary lateral color aberration and the chromatic field curvature aberration are well corrected. The residual aberrations are a small amount of chromatic field curvature and chromatic off-axis spherical aberration. It can be seen that the axial field is not corrected nearly as well as the above example, FIG. 6, with a single diffractive lens because the paraxial chromatic foci are not exactly the same, but the difference is not significant. The increased chromatic focal error is compensated by a larger value of spherical aberration.

Now it will be shown in detail how the aberration contributions are distributed throughout the three lens cases discussed above. In the tables below, all the aberrations are transverse, i.e. they are differences of ray heights at the image plane. For the primary and secondary axial aberration, they are marginal ray height differences in the blue and red, and blue and green respectively. For the primary and secondary lateral color aberration, they are the chief ray height differences in the blue and red and in the blue and green respectively.

TABLE III

Chromatic aberrations with no diffractives

| | Primary Axial | Secondary Axial | Primary Lateral | Secondary Lateral |
|---|---|---|---|---|
| Refractive total | .00369 | .01782 | −.00805 | −.00186 |

TABLE IV

Chromatic aberrations with one diffractive

| | Primary Axial | Secondary Axial | Primary Lateral | Secondary Lateral |
|---|---|---|---|---|
| Refractive sum | −.09144 | −.05479 | −.02883 | −.01337 |
| Middle diffractive | .09272 | .05528 | .02636 | .015714 |
| Total | .00128 | .00049 | −.00247 | .00234 |

As can be seen from a comparison of Table III and Table IV, the refractive contributions are much larger in the lens with one diffractive in the middle of the lens. There are several reasons for this. First, with larger refractive contributions, the refractive lenses are not as constrained in their powers distributions to correct axial color aberration as they would be without the diffractive lens. This leaves more freedom for the correction of other aberrations such as coma and chromatic field curvature. Second, the larger contributions are needed to offset the relatively large contributions from the diffractive lens. The residual totals are much reduced from the all-refractive lens, especially the secondary lateral aberration which is really zero. While the primary lateral color aberration is reduced, the secondary lateral color aberration is a bit worse for this lens. So, the diffractive lens improves the overall lateral color aberration, but the lateral color aberration totals are still larger in comparison with the axial totals.

TABLE IV

Chromatic aberrations with two diffractives

|  | Primary Axial | Secondary Axial | Primary Lateral | Secondary Lateral |
|---|---|---|---|---|
| Refractive sum | −.09028 | −.05359 | −.03643 | −.02122 |
| Middle diffractive | .11911 | .07102 | .01056 | .00630 |
| Front diffractive | −.01958 | −.01167 | .02487 | .01482 |
| Total | .00925 | .00576 | −.00100 | −.00010 |

The following formulae are the contributions to chromatic aberration of diffractive lenses:

$$\text{Primary axial (transverse) chromatic} = \frac{1}{u'}\sum_i y_i^2 \frac{K_i}{V_i} =$$

$$\frac{\lambda_F - \lambda_C}{\lambda_d} \frac{1}{u'}\sum_i y_i^2 K_i$$

$$\text{Secondary axial (transverse) chromatic} = \frac{1}{u'}\sum_i y_i^2 K_i \frac{P_i}{V_i} =$$

$$\frac{\lambda_F - \lambda_d}{\lambda_d} \frac{1}{u'}\sum_i y_i^2 K_i$$

$$\text{Primary lateral (transverse) chromatic} = \frac{1}{u'}\sum_i \bar{y}_i y_i \frac{K_i}{V_i} =$$

$$\frac{\lambda_d}{\lambda_F - \lambda_C} \frac{1}{u'}\sum_i \bar{y}_i y_i K_i$$

$$\text{Secondary lateral (transverse) chromatic} = \frac{1}{u'}\sum_i \bar{y}_i y_i K_i \frac{P_i}{V_i} =$$

$$\frac{\lambda_F - \lambda_d}{\lambda_d} \frac{1}{u'}\sum_i \bar{y}_i y_i K_i$$

In the above equations, u' is the paraxial marginal ray final convergence angle in the image, $y_i$ the paraxial marginal ray height on the diffractive and $y_i$ with the overbar is the paraxial chief ray height on the diffractive. It can be seen that the ratio of secondary axial aberration to primary axial aberration is the same as the ratio of the secondary lateral aberration to primary lateral aberration and is dependent only on wavelengths as shown below. This is reflected in tables II through IV The diffractive "V" number is only dependent on the wavelengths:

$$V = \frac{\lambda_d}{\lambda_F - \lambda_C}$$

Secondary chromatic aberration is proportional to the partial dispersion P divided by V. The ratio of partial dispersion P to V for diffractives is dependent only on wavelengths:

$$\frac{P}{V} = \frac{\lambda_F - \lambda_d}{\lambda_d}$$

In these equations, $\lambda_d$ is the yellow helium "d" line near the center of the visible spectrum, 0.58756 micrometers. $\lambda_F$ is the blue hydrogen line towards the blue end of the visible spectrum, 0.48613 micrometers. $\lambda_C$ is the red hydrogen line towards the red end of the visible spectrum, 0.65627 micrometers.

In examining the table IV data, one can see that to reduce the primary lateral color aberration with another diffractive in front of the lens, it should have negative diffractive power to give an overall positive contribution because $\lambda_d/(\lambda_F - \lambda_d)$=−3.4534 and u is negative for a positive lens. The chief ray and marginal ray height product is also negative. This will also add to the secondary lateral color aberration, although to a lesser extent. In order to reduce the secondary color aberration as well, it is necessary to either reduce the secondary color aberration contribution from the center diffractive, or increase the refractive contribution. As can be seen from table III, both of these methods have been used. It will also be noted that the primary lateral aberration contribution from the central lens has been reduced, but both primary and secondary axial aberration contributions are increased. This can only be done if the chief ray height on the central diffractive is reduced and that is the case in this design, having chief ray heights of 3.77 for table IV and 1.23 for table V.

A result is that if the aim is to reduce the total chromatic sum of axial aberration as in going from table III to table IV, the refractive lens contributions need to actually increase in the wrong direction. This is also true for reducing the lateral color aberration total in going from table IV to table V. Neither of these methods are obvious and in fact are counter intuitive.

To reduce the lateral color aberration by introducing a second diffractive in the rear of the lens, it would be necessary for the diffractive to have positive power because the chief ray and marginal ray product is positive there.

In addition to correcting chromatic aberrations, diffractive optical elements can correct other aberrations, specifically, spherical aberration. If the phase varies across the DOE in a radially symmetric polynomial as one would expect for a rotationally symmetric optical system such as this, a phase function of the following form would be appropriate:

$$\Phi(r) = A_2 r^2 + A_4 r^4 + A_6 r^6 + \ldots + A_{2n} r^{2n}$$

In this equation, r is the radial distance from the center of the DOE and $\Phi$ is the phase introduced into the wavefront at that radial position on the DOE. The term in $r^2$ affects the power or effective focal length, $f_d$, of the diffractive and is given by:

$$f_d = -\frac{1}{2A_2}$$

The term in $r^4$ affects the third order spherical aberration. The Seidel coefficient, $S_{Id}$, for the spherical aberration measured as wavefront aberration is:

$$S_{Id} = -8A_4 y^4$$

In this formula, y is the paraxial marginal ray height on the diffractive surface. The $6^{th}$ order term affects the $5^{th}$ order spherical aberration and so on for the higher order terms. To appreciate the benefits of the diffractive lens in the correction of spherical aberration it is useful to examine the contributions to $3^{rd}$ order spherical aberration for the three lenses discussed above.

In the all-refractive lens shown in FIG. 4, the largest contribution to $3^{rd}$ order spherical aberration comes from lens element number 15 with a value of 4.48 mm of transverse spherical. This large positive amount is partially cancelled by lens element 14, contributing a negative 3.14 mm. Also, as to be expected, these elements contribute the largest amount to $5^{th}$ order spherical aberration. Fortunately, the total 3$^{rd}$ order spherical from all elements is compensated by the total 5$^{th}$ order spherical from all elements and this can be seen in the axial aberration curves of green light 26 in FIG. 5. The total 3$^{rd}$ order spherical is −0.052 mm and the total 5$^{th}$ order spherical is 0.037 mm.

For the retro-focus lens 30 with one diffractive lens 33 in the center shown in FIG. 6, the largest contribution to 3$^{rd}$ order spherical aberration is from lens element 35, the analogue of element 15 in the all-refractive lens in FIG. 4. Lens element 35 contributes 2.29 mm of transverse 3$^{rd}$ order spherical aberration. The next largest contribution comes from element 37 with a value of −1.30 mm. In comparison, the one-diffractive design's largest contribution has a value about half that of the all-refractive design. The total refractive contributions for the lens with one diffractive lens is −0.145 mm of 3$^{rd}$ order spherical aberration. This is quite a bit larger than the all-refractive design, but this value is nearly cancelled by the diffractive 3$^{rd}$ order contribution of 0.13 mm leaving only −0.0144 mm of 3$^{rd}$ order spherical aberration, about one third that of the all-refractive lens. This lens also has much smaller contributions to 5$^{th}$ order spherical aberration. The largest value of 5$^{th}$ order spherical aberration is 0.55 mm from lens element 35. This is much less than that of the all-refractive lens largest contribution of 1.42 mm of 5$^{th}$ order spherical aberration from element 15, shown in FIG. 4. The type of aberration balance, smaller contributions and a balance of 3$^{rd}$ and 5$^{th}$ with smaller values as obtained from the one diffractive design is much preferred. The reason is that this lens is much less susceptible to manufacturing errors. Manufacturing errors generally affect 3$^{rd}$ order aberrations to a larger extent, so a perturbation in the 3$^{rd}$ order spherical would upset the aberration balance to a lesser extent is such a design.

The balance in aberrations of the two diffractive lens design is similar to that of the one diffractive design in that the contributions are again reduced. The largest 3$^{rd}$ order contribution to spherical aberration, 1.99 mm, comes from element 36, the analogue of element 15 and 35 in the above designs. The improvement is not as dramatic as compared to that of going from the all-refractive design to the one diffractive design. The total refractive 3$^{rd}$ order spherical aberration is contributions is −0.24 mm, but this is nearly cancelled by the 0.23 mm contribution from the middle diffractive. Diffractive element 30 adds to the refractive contribution for a net total of −0.0139, which is only slightly reduced from the single diffractive design. The largest 5$^{th}$ order contribution is about the same as the single diffractive design.

Figure 1:
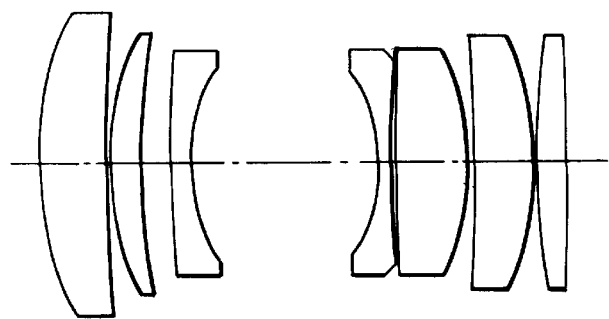
FIG. 1 shows a cross sectional view of a prior art movie projection lens.
Figure 2A:
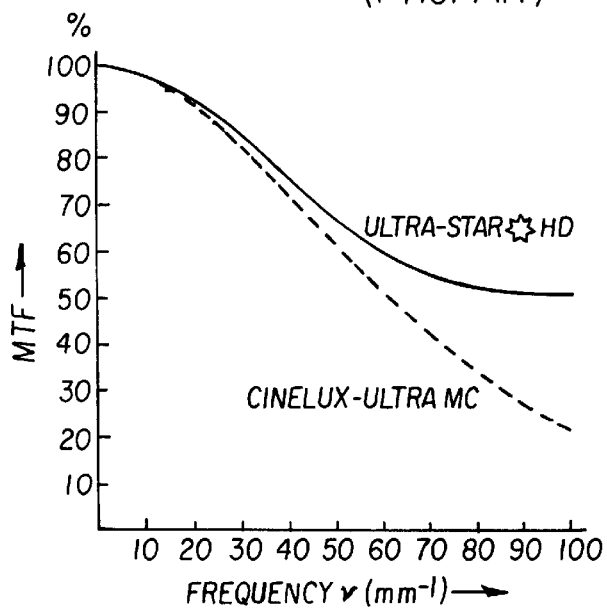
FIGS. 2a and 2b are graphs of modulation transfer function for two prior art lenses.
Figure 2B:
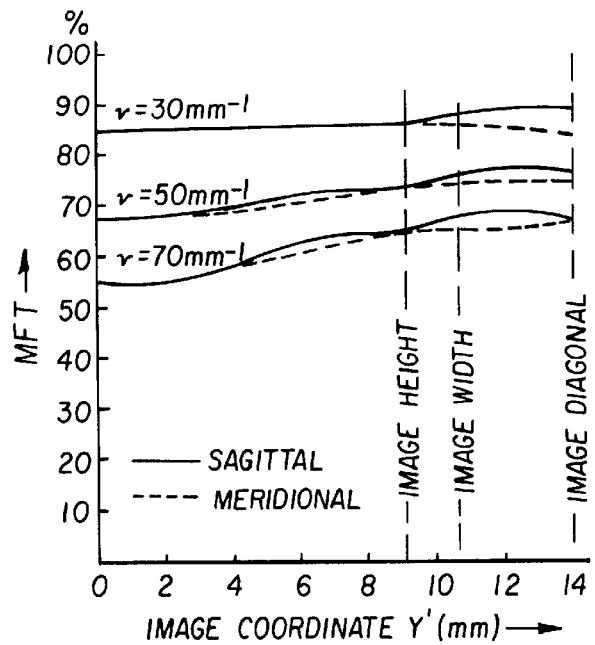
Figure 3A:
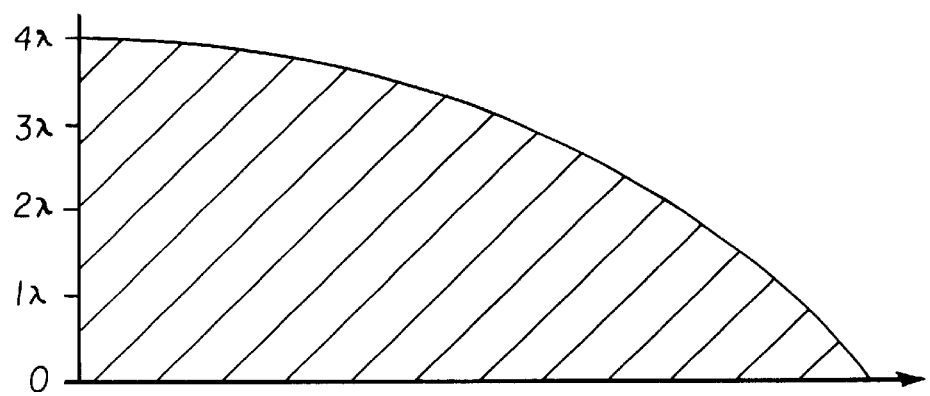
FIGS. 3a–3e are graphs of continuous phase across optical wavefronts induced by a refractive surface.
Figure 3B:
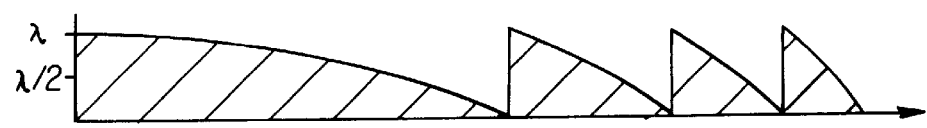
Figure 3C:
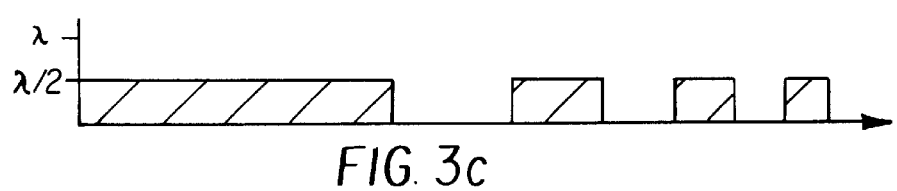
Figure 3D:
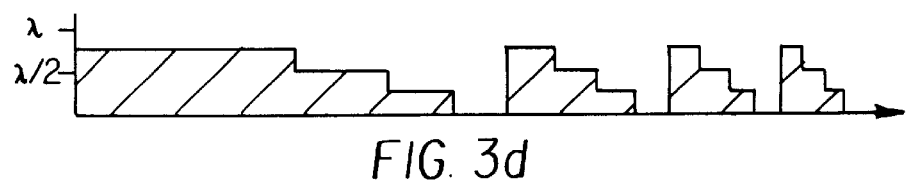
Figure 3E:
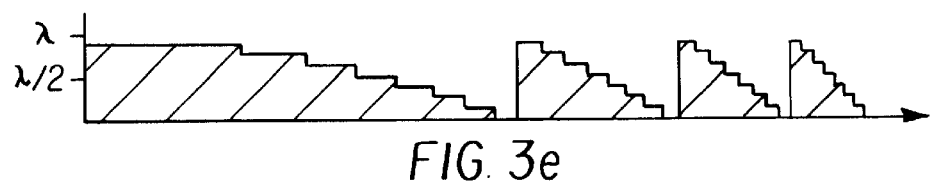
Figure 10:
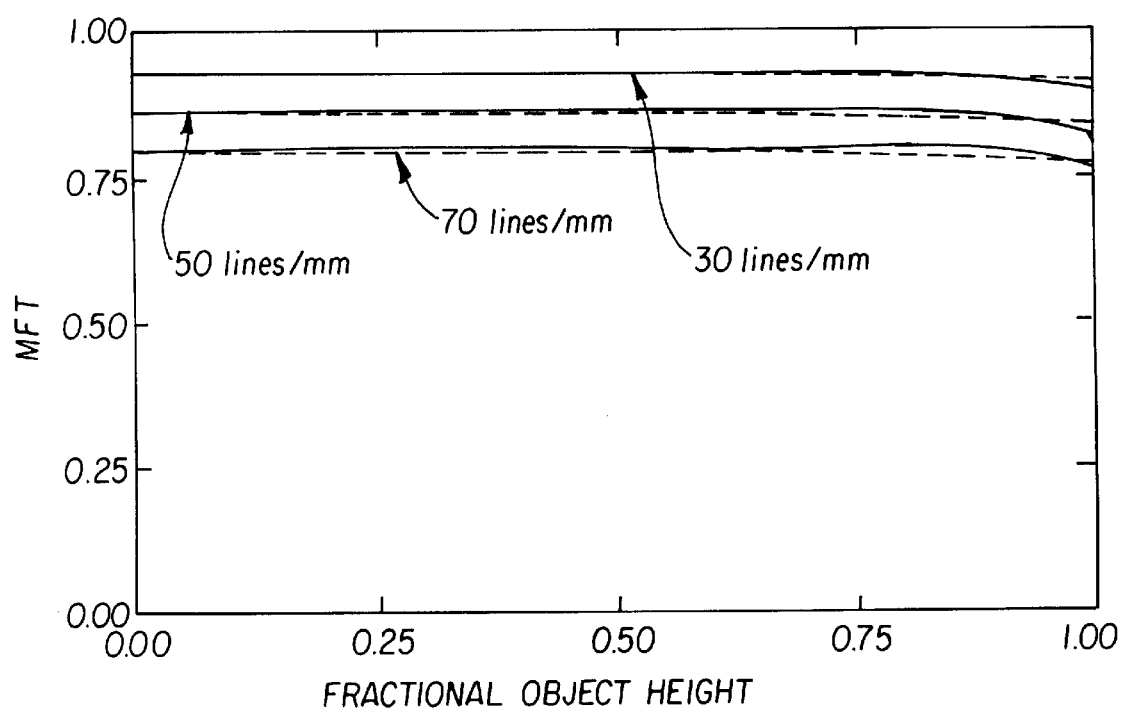
FIG. 10 is a graph of modulation transfer function versus fractional object height for the lens shown in FIG. 8.

To understand the improvement in image quality achievable using two diffractive lenses, it is helpful to compare the MTF to that published for state of the art projections lenses. FIG. 10 illustrates the MTF across the image field for three spatial frequencies, 30, 50, and 70 line pairs per millimeter for the movie projection lens 40 with two diffractive lenses. This compares to FIG. 2b for the current state of the art. The improvement is substantial, especially in the central image area. For 30 lines/mm, the MTF improves from about 85% to 93%, for 50 lines/mm it improves from about 68% to 86%, and for 70 lines/mm it improves from about 55% to 80%. In fact the curves for all three frequencies are above 77% MTF across the field.

The invention has been described in detail with particular reference to certain preferred embodiments thereof, but it will be understood that variations and modifications can be effected within the scope of the invention.

Parts List

10. All-refractive lens
11. First lens
14. Lens element
15. Element
17. Last lens
20. Focal length
22. Blue
24. Red
26. Green light
30. Retro-focus lens
33. Diffractive lens
35. Lens element
36. Element
37. Element
40. Movie projection lens
42. Negative diffractive lens
43. Positive refractive lens element
44. Negative Refractive lens element
45. Group
46. Group
62. Movie screen
64. Film

What is claimed is:

1. A movie projection lens for forming an image over the visible spectrum, at high magnification, said movie projection lens comprising in order, from movie screen side of said movie projection lens;

a diffractive lens with negative power;

followed by a group of positive and negative refractive lens elements with overall negative power;

a diffractive lens with positive power;

followed by a group of positive and negative refractive lens elements with overall positive power;

wherein said positive power diffractive lens ha s minimal affect on lateral chromatic aberration; and wherein said negative power diffractive lens affects both lateral and axial chromatic aberration and has a greater affect on lateral aberration than on axial aberration.

2. A movie projector lens as in claim 1 wherein said positive power diffractive lens contributes third order spherical aberration of opposite sign to said refractive lens elements contributions.

3. A movie projection lens as in claim 2 wherein said negative power diffractive lens contributes third order spherical aberration of the same sign as the refractive lens elements contributions.

4. A movie projection lens as in claim 2 wherein said positive power diffractive lens contributes fifth order spherical aberration of the same sign as said positive power diffractive lens third order spherical aberration contribution.

5. A movie projection lens as in claim 4 wherein said negative power diffractive lens contributes fifth order spherical aberration of opposite sign to said negative power diffractive lens third order spherical aberration contribution.

6. A movie projection lens as in claim 1 having back focus distance larger than overall lens focal length.

7. A movie projection lens as in claim 6 in which an optical power of said negative diffractive lens divided by an optical power of said movie projection lens is less than −0.003 and greater than −0.012.

8. A movie projection lens as in claim 6 in which an optical power of said positive diffractive lens divided by an optical power of said movie projection lens is less than 0.01 and greater than 0.05.

* * * * *